United States Patent
Zajac

(10) Patent No.: US 9,869,241 B2
(45) Date of Patent: Jan. 16, 2018

(54) SPLIT CYCLE ENGINE AND METHOD OF OPERATION

(71) Applicant: John Zajac, San Jose, CA (US)

(72) Inventor: John Zajac, San Jose, CA (US)

(*) Notice: Subject to any disclaimer, the term of this patent is extended or adjusted under 35 U.S.C. 154(b) by 299 days.

(21) Appl. No.: 14/454,120

(22) Filed: Aug. 7, 2014

(65) Prior Publication Data

US 2016/0040592 A1 Feb. 11, 2016

(51) Int. Cl.
| | |
|---|---|
| *F02B 43/00* | (2006.01) |
| *F02D 19/02* | (2006.01) |
| *F02M 21/00* | (2006.01) |
| *F02B 43/10* | (2006.01) |
| *F02B 43/04* | (2006.01) |

(52) U.S. Cl.
CPC .............. *F02B 43/10* (2013.01); *F02B 43/04* (2013.01); *F02D 19/022* (2013.01); *Y02T 10/32* (2013.01)

(58) Field of Classification Search
CPC .......... F02B 43/00; F02B 43/04; F02B 43/12; F02B 3/00; F02B 3/06; F02B 3/08; F02B 19/14; F02B 33/22; F02B 33/02; F02B 41/06; F02D 19/022; F02D 19/02; F02M 21/00; F02M 21/0218; F02M 23/00; F02M 26/00; F02M 2700/33; F02M 2700/338; Y02T 10/32; Y02T 10/42; Y02T 10/44
USPC ......... 123/527, 528, 575, 275, 70 R; 60/39.6
See application file for complete search history.

(56) References Cited

U.S. PATENT DOCUMENTS

| | | | |
|---|---|---|---|
| 1,597,924 A | 8/1926 | Powell | |
| 3,267,661 A | 8/1966 | Petrie | |
| 3,811,271 A | 5/1974 | Sprain | |
| 4,212,163 A | 7/1980 | Mikina | |
| 4,565,167 A | 1/1986 | Bryant | |
| 4,783,966 A | 11/1988 | Aldrich | |
| 7,415,947 B2 | 8/2008 | Zajac | |
| 7,434,551 B2 | 10/2008 | Zajac et al. | |
| 7,481,189 B2 | 1/2009 | Zajac | |
| 8,371,103 B2 | 2/2013 | Zajac | |
| 2001/0004515 A1 | 6/2001 | Scarinci et al. | |
| 2003/0230249 A1 | 12/2003 | Yamaoka et al. | |
| 2007/0199299 A1* | 8/2007 | Kashmerick | F02G 1/02 60/39.6 |
| 2009/0056670 A1* | 3/2009 | Zhao | F02B 41/06 123/25 P |

(Continued)

*Primary Examiner* — Grant Moubry
(74) *Attorney, Agent, or Firm* — Edward S. Wright

(57) ABSTRACT

Split cycle engine that runs on gaseous fuels such as natural gas and synthesis gas (syngas) and to a method of operating the same. The engine includes a first compression chamber for compressing the gaseous fuel, means for supplying the gaseous fuel to the first compression chamber at a level of concentration that prevents predetonation of the fuel during compression, a second compression chamber for compressing air, a combustion chamber in which the compressed fuel and air are combined to reduce the concentration of the fuel to a level that allows the fuel to burn and expand in the combustion chamber, and an expansion chamber having an output member which is driven by expanding gas from the combustion chamber.

Turbochargers or blowers pressurize and increase the volume of the fuel and air delivered to the respective compression chambers, and the concentration of the fuel is progressively reduced by the injection of air at spaced intervals as the fuel travels toward the compression chamber.

18 Claims, 2 Drawing Sheets

(56) References Cited

U.S. PATENT DOCUMENTS

2012/0298086 A1* 11/2012 Scuderi .................. F02B 33/22
                                                                    123/70 R
2013/0340474 A1    12/2013 Jung et al.

* cited by examiner

SPLIT CYCLE ENGINE AND METHOD OF OPERATION

BACKGROUND OF THE INVENTION

Field of Invention

This invention pertains generally to combustion engines and, more particularly, to a split cycle engine that runs on gaseous fuels such as natural gas and synthesis gas (syngas) and to a method of operating the same.

Related Art

Even though natural gas and synthesis gas (syngas) may be available in abundant supply, they are often not used as fuel for Otto cycle and diesel engines because of problems such as predetonation. In order to avoid knocking and serious damage resulting from predetonation, engines running on these fuels are sometimes detuned and run on lower compression ratios. However, since the efficiency of the engine is directly related to the compression ratio, reducing the compression ratio can significantly impact the efficiency of an engine. For example, reducing the compression ratio from 16:1 to 9:1 in a diesel engine causes a reduction in efficiency on the order of 30%.

Syngas is made by gasification of biomass and fossil fuels, and the properties of syngas vary with each type of feedstock used. This complicates the problem and can also require compression to be kept at a lower level. The properties of natural gas also change with time as wells produce less oil and the concentrations of water, oil, methane, and other gases vary. Consequently, present engines are inefficient and dirty.

Using detuned diesel engines also creates a large amount of particles, soot, smoke, and other pollutants. Some jurisdictions currently provide air pollution exemptions for such engines because they think that burning the biomass from which the fuels are made would produce even more pollutants. It is strongly believed that if an improved technology were demonstrated, these exemptions would be eliminated, and all future engines would be required to comply with strict air pollution standards already enacted as law.

U.S. Pat. No. 7,481,189 and a number of others issued to the inventor herein introduce internal and external combustion engines having separate compression, combustion, and expansion chambers. These split cycle engines have a number of advantages over conventional diesel and Otto cycle engines, including greater efficiency, the ability to run extremely cleanly without any costly or complicated after treatment, and the ability to run on different fuels without changes in power or cleanliness. However, with gaseous fuels such as natural gas and syngas, great volumes of gas have to be injected at high pressures (e.g., in the range of 500 to 5,000 psi), and the work required to inject the large volumes at high pressure is problematical.

In order to avoid the excessive work required to inject large volumes of gas at high pressure into the engine, diesel manufactures have been sucking the gas into the air intake of the engine, sometimes with the aid of a turbocharger or blower. However, this can also cause predetonation or knocking which can quickly and permanently damage the engine.

OBJECTS AND SUMMARY OF THE INVENTION

It is, in general, an object of the invention to provide a new and improved engine that runs on gaseous fuels and to a method of operating the same.

Another object of the invention is to provide an engine and method of the above character which overcome the limitations and disadvantages of engines and methods of operation heretofore provided.

These and other objects are achieved in accordance with the invention by providing a split cycle engine for burning gaseous fuel which includes a first compression chamber for compressing the gaseous fuel, means for supplying the gaseous fuel to the first compression chamber at a level of concentration that prevents predetonation of the fuel during compression, a second compression chamber for compressing air, a combustion chamber in which the compressed fuel and air are combined to reduce the concentration of the fuel to a level that allows the fuel to burn and expand in the combustion chamber, and an expansion chamber having an output member which is driven by expanding gas from the combustion chamber. Turbochargers or blowers pressurize and increase the mass of the fuel and air delivered to the respective compression chambers, and the concentration of the fuel is progressively reduced by the injection of air at spaced intervals as the fuel travels toward the compression chamber.

DETAILED DESCRIPTION

Figure 1:
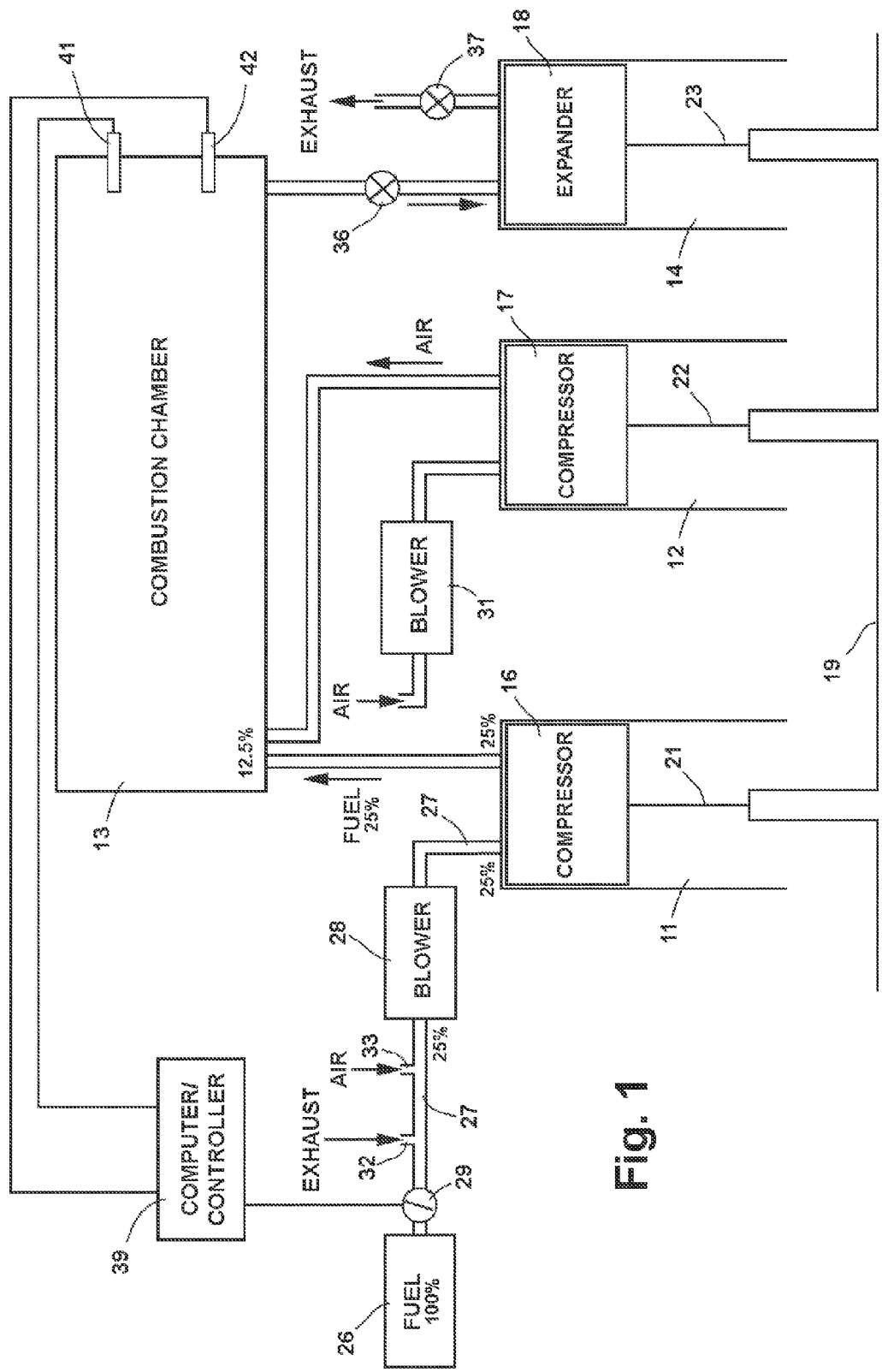
FIG. 1 is a schematic diagram of one embodiment of an engine for burning gaseous fuel in accordance with the invention.

As illustrated in FIG. 1, the engine has a pair of compression cylinders 11, 12, a combustion chamber 13, and an expansion cylinder 14, with reciprocating pistons 16, 17, 18 in the compression and expansion cylinders forming chambers of variable volume. The pistons are connected to a crankshaft 19 by connecting rods 21, 22, 23 for movement in concert between top dead center (TDC) and bottom dead center (BDC) positions in the cylinders, with each of the pistons making one upstroke and one downstroke during each revolution of the crankshaft. The piston 18 in expansion cylinder 14 is at times referred to hereinafter as an output member.

Fuel is supplied to the combustion chamber from a tank 26 via a fuel line 27, a turbocharger or blower 28, and compression cylinder 11, with a butterfly valve 29 or other suitable controller in the fuel line for controlling the amount of fuel entering the blower.

Air is supplied to the combustion chamber from compression cylinder 12, with a turbocharger or blower 31 for increasing the pressure and amount of air delivered to the compressor and, hence, to the combustion chamber.

Throughout this specification and claims, the term "blower" is used generically and encompasses not only superchargers and turbochargers, but also other suitable devices for increasing the pressure and amount of air and/or fuel delivered to the compressors. The blowers for the fuel and air do not have to be of equal size, and any ratio of gas to air can be accommodated. In some applications, it may not be necessary to boost the pressure or amount of air and fuel, in which case the blowers are not needed.

The engine runs on a gaseous fuel such as natural gas or syngas which can only burn when it is at certain levels of concentration in air. Those levels generally lie within a defined range having upper and lower limits which are commonly referred to as flammability limits or explosive limits. These limits vary with temperature and pressure, with the lower limit becoming lower and the upper limit becoming higher at higher temperatures and both limits becoming higher as pressure increases. The limits are commonly expressed in terms of volume percentage at 25° C. and atmospheric pressure.

Natural gas is a hydrocarbon gas mixture that varies in composition and consists primarily of methane ($CH_4$), but it may also contain ethane, propane, and heavier hydrocarbons, along with small quantities of nitrogen, oxygen, carbon dioxide, sulfur compounds, and/or water. The composition can vary from source to source and from day to day. Syngas is a fuel gas mixture consisting primarily of hydrogen, carbon monoxide, and frequently some carbon dioxide. At room temperature and atmospheric pressure, natural gas and syngas typically have a flammability range on the order of about 5% to about 15%, although this range can vary with factors such as the composition of the gas and impurities in it. When these gases are compressed, the increases in pressure and temperature can cause the upper limit of the flammability range to increase to levels greater than 15%.

Since the fuel is primarily a gas having a boiling temperature at atmospheric pressure that is lower than ambient temperature, the fuel is truly a gas and not a liquid.

The gaseous fuel flowing from tank 26 toward compression cylinder is diluted with exhaust gas that is introduced into fuel line 27 through an inlet 32. The exhaust gas contains relatively little oxygen, and diluting rich fuel mixtures in this manner allows the engine to operate at higher pressures without causing predetonation. Hence, the engine can run at higher compression ratios with greatly improved efficiency. In addition to avoiding predetonation, diluting the fuel with exhaust gas also reduces NOx production. If desired, exhaust gas can also be introduced at the inlet of blower 31 to further reduce oxygen content and NOx emissions.

The natural gas or syngas in fuel tank 26 typically has a concentration level of 100%, which is well above the range in which the gas is combustible. Therefore, in order for the gas to burn in combustion chamber 13, it must be diluted to a level of concentration within the flammability range. At the same time, however, the concentration of the gas in compression cylinder 11 must be outside the flammability range in order to avoid predetonation. For this purpose, the gas is diluted with air as it passes through fuel line 27, and after being compressed, it is further diluted with air from compression cylinder 12 to a level within the flammability range as it enters the combustion chamber.

In the embodiment illustrated, it is assumed that the flammability range of the fuel in compression chamber 11 is between 5% and 15%, and air is introduced into fuel line 27 through an inlet 33 positioned between fuel tank 26 and blower 28. If desired, however, additional air inlets can be provided in the line to reduce the concentration of the fuel in a series of steps, e.g., from 100% to 75%, then from 75% to 50%, and then from 50% to 25%. In the embodiment illustrated, the concentration is reduced from 100% to 25% in a single step, and following compression, the concentration is reduced from 25% to 12.5% by mixing the fuel with air from compression cylinder 12 as it enters the combustion chamber.

Since the flammability range of the fuel is, to some extent, dependent upon factors such as temperature and pressure as well as the composition of the gas, impurities in the gas, and the amount of exhaust gas introduced, the upper and lower limits of the range are best determined empirically, with the concentration levels of the fuel in the compression cylinder and in the combustion chamber being selected to accommodate such variations while avoiding predetonation in the compression cylinder and maintaining combustibility in the combustion chamber.

As long as the fuel is compressed at a concentration level outside the flammability range, there is no chance of predetonation while it is being compressed, and the engine can operate at compression ratios on the order of 10:1 to 16:1, or higher, with substantially greater efficiency than engines that are limited to lower compression ratios. The concentration of the fuel can be adjusted to account for special conditions or for different fuels by changing the amount of air that dilutes the fuel. Thus, for example, if the upper limit of the flammability range of fuel in the compression cylinder were to increase to 25% because of pressure in the cylinder, then less air would be mixed with the fuel in order to keep the concentration level of the fuel above 25% in that cylinder.

After mixing with the compressed air in the combustion chamber, the diluted fuel burns and expands, and the expanding gas flows into the expansion cylinder from the combustion chamber through an inlet valve 36. Although only one expansion cylinder is shown as an example in FIG. 1, the engine can have a series of such cylinders. Exhaust gas is discharged from the expansion cylinder through an exhaust valve 37. An engine of this general type but runs on liquid fuel is described in greater detail in U.S. Pat. No. 7,415,947, the disclosure of which is incorporated herein by reference.

The valves can be poppet valves, rotary valves, electronic valves, or other suitable valves which permit a wide range of adjustment in the timing of the valves. A poppet valve system which is particularly suitable for use as inlet valve 36 is described in detail in U.S. Pat. No. 8,371,103, the disclosure of which is also incorporated herein by reference. The opening or closing positions of the valves can be varied independently of each other, i.e., the opening positions can be adjusted without affecting the closing positions, or the closing positions can be adjusted without affecting the opening positions. In addition, the valves can be adjusted independently of each other and while the engine is running. This full adjustability of the valve system permits continuous matching of engine performance with every combination of load and speed. However, in an engine designed to operate at a fixed speed, e.g. to drive a generator, fixed timing valves can also be used.

A combustion chamber which is particularly suitable for use in the engine is described in detail in U.S. Pat. No. 7,434,551, the disclosure of which is also incorporated herein by reference. That chamber is elongated and, in some embodiments, folded back upon itself, with a rough, twisting interior side wall. In others, it is straight. The chamber is a double wall structure which can have an outer wall of structurally strong material such as steel and/or a composite material and a liner of thermally insulative ceramic material or an inner wall of structurally strong material and an outer wall of thermally insulative ceramic material. In some embodiments, a flow separator divides the combustion chamber into one or more smaller sections where fuel can mix and burn with only a portion of the air introduced into the chamber, with additional air being mixed with the burning mixture downstream to provide an overall mixture that is effectively leaner. Some embodiments have flow turbulators to promote complete mixing and combustion of the fuel and air, and some have long, sharp protrusions that extend inwardly from the side wall and form hot spots which help to provide complete combustion of the fuel mixture throughout the chamber.

Temperature and pressure sensors monitor conditions throughout the engine and provide that information to a computer/controller 39 which controls the delivery of fuel to the combustion chamber and the timing of the valves in accordance with the environmental and load conditions. For convenience of illustration, only one temperature sensor 41 and one pressure sensor 42 are shown in FIG. 1, and they are shown as monitoring temperature and pressure conditions in the combustion chamber. However, it will be understood that other sensors monitor conditions throughout the engine and provide information that is utilized by the computer and controller in controlling the timing of the valves and the delivery of fuel to the combustion chamber. Such sensors can, for example, monitor temperature and/or pressure in the compression and expansion cylinders, the engine head and crankcase, the intake and exhaust manifolds, and the cooling system for the engine.

The ratio of fuel to air can be adjusted to account for special conditions or for different fuels by changing the size or number of air inlets that dilute the fuel before and/or after the fuel blower or turbocharger, or by adjusting the flow of air passing through the air inlet(s).

Figure 2:
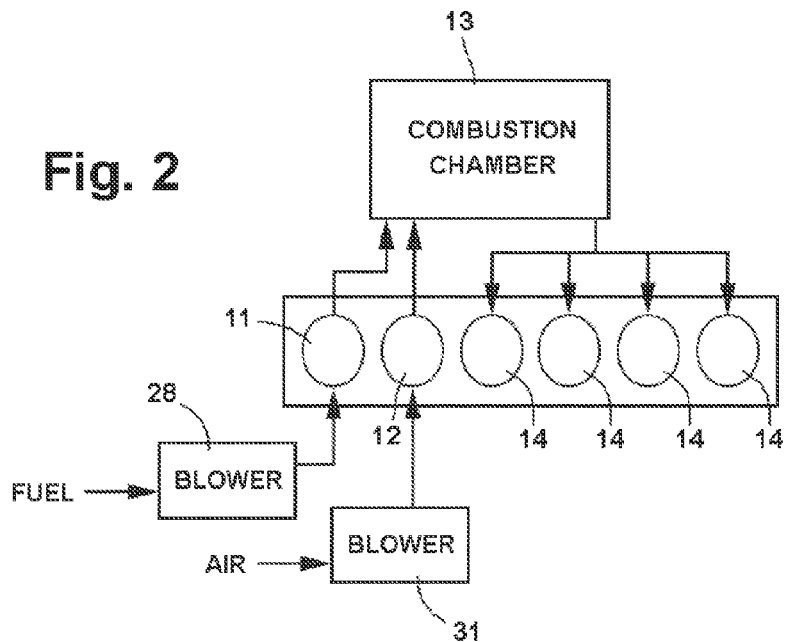
FIG. 2 is a simplified schematic diagram of an embodiment of a six cylinder split cycle internal combustion engine incorporating the invention.

The engine can have any number of cylinders equal to or greater than three. For example, as illustrated in FIG. 2, a six cylinder engine incorporating the invention would typically be configured with two compression cylinders and four expansion cylinders. With eight cylinders, the engine would have two compressors and six expanders, with larger turbochargers or blowers to accommodate the additional expanders. The engine can also have more than one compression cylinder and/or blower both for the fuel and for the air, and it can likewise have more than one combustion chamber.

With combustion taking place in a separate chamber and that chamber being a hot wall reactor without cold spots or cooling, the gas has more time to burn at high temperature and to burn completely, thereby avoiding the production of pollution. With about 10 times longer for the fuel to complete its burn, byproducts other than carbon dioxide and water are virtually eliminated.

Figure 3:
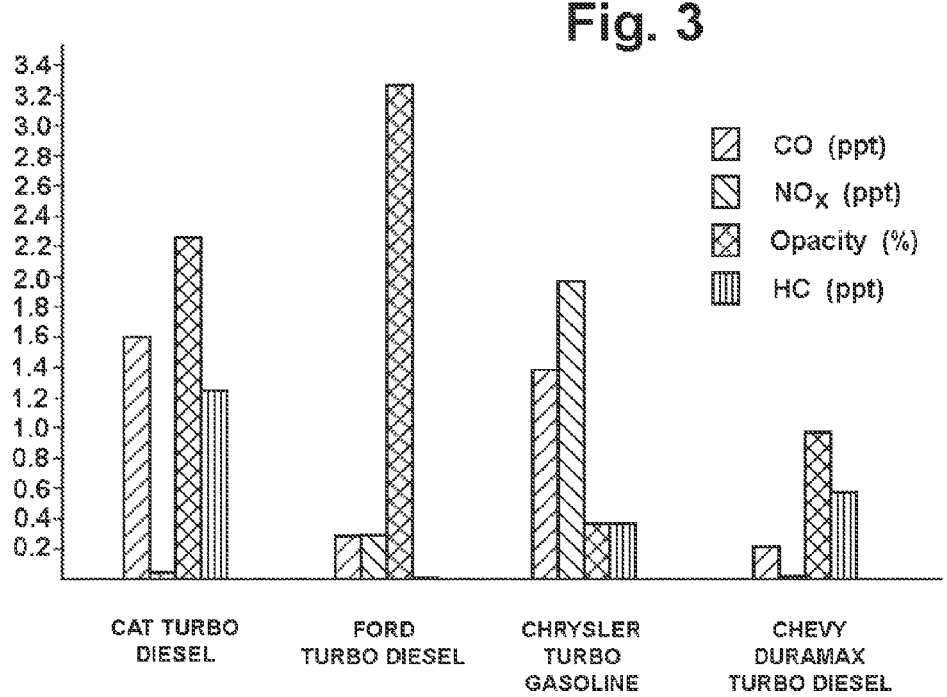
FIG. 3 is a graphical representation of pollutants produced by conventional Otto cycle and diesel engines.

In comparative testing with exhaust emissions from Otto and diesel engines, the engine of the invention was found to produce significantly less pollution than the other engines. The emissions were tested for carbon monoxide (CO), nitrogen oxides (NOx), opacity (a measure of particulate, particles, smoke, and soot), and hydrocarbons (HC), and the results for a Caterpillar turbo diesel, a Ford turbo diesel, a Chrysler turbo gasoline engine, and a Chevrolet Duramax turbo diesel are shown graphically in FIG. 3. As this graph shows, CO emissions ranged from about 0.2 parts per thousand (ppt) in the Chevy engine to about 1.6 ppt in the Caterpillar engine, NOx emissions ranged from about 0.02 ppt in the Chevy engine to about 2.0 ppt in the Chrysler engine, opacity ranged from about 0.4% in the Chrysler engine to about 3.2% in the Ford engine, and CH emissions ranged from near zero in the Ford engine to about 1.2% in the Caterpillar engine.

In contrast, with the engine of the invention, there were no CO or HC emissions, no particulates, particles, or smoke, and only about 0.02 ppt NOx emissions. Moreover, the emissions from the Otto and diesel engines were measured after treatment by catalytic converters, filters, and the like, whereas exhaust emissions from the engine of the invention were measured without any after treatment at the exhaust manifold.

The invention has a number of important features and advantages. By controlling the concentration of the gas during compression, the engine can operate at higher compression ratios and with much greater efficiency without danger of predetonation. The gas burns cleanly and completely at high temperature without creating particulate particles, soot, carbon monoxide, NOx, and/or other pollutants, and the closed loop feedback system automatically adjusts for changes in fuel so that power and cleanliness are never compromised with different fuels.

One particularly valuable application of the invention is in the burning of natural gas at oil and gas wells to generate electricity. In many instances, running a gas pipeline to remote areas to capture such gas is not feasible, so the gas is simply burned off or flared. Flaring, however, is illegal in many states and countries because it causes vast amounts of pollution and wastes a valuable energy source, and where pipelines are not feasible, wells have been shut down and capped off. By using the gas from the wells to power engines that drive generators, the invention reduces or eliminates the wasteful and polluting practice of flaring. At the same time, it can produce valuable electricity and allow previously capped wells to resume operation and once again produce valuable oil.

Although the invention has been disclosed with specific reference to piston engines, it can also be implemented with turbines and other suitable types of engines.

It is apparent from the foregoing that a new and improved engine and method of operation have been provided. While only certain presently preferred embodiments have been described in detail, as will be apparent to those familiar with the art, certain changes and modifications can be made without departing from the scope of the invention as defined by the following claims.

The invention claimed is:

1. A split cycle engine for burning gaseous fuel, comprising: a first compression chamber having a compression ratio on the order of at least 10:1 to 16:1 for compressing the gaseous fuel, means for adjusting the concentration of gaseous fuel supplied to the first compression chamber to a level that prevents predetonation of the fuel during compression at a ratio on the order of at least 10:1 to 16:1, a second compression chamber for compressing air, a combustion chamber in which the compressed fuel and air are combined to reduce the concentration of the fuel to a level that allows the fuel to burn and expand in the combustion chamber, and an expansion chamber having an output member which is driven by expanding gas from the combustion chamber.

2. The engine of claim 1 including means for pressurizing the gaseous fuel and the air to increase the amounts of fuel and air supplied to the compression chambers.

3. The engine of claim 1 including means for progressively reducing the concentration level of the gaseous fuel before the fuel is delivered to the compression chamber.

4. The engine of claim 1 wherein the fuel has a boiling temperature at atmospheric pressure that is lower than ambient temperature.

5. The engine of claim 1 wherein the gaseous fuel is selected from the group consisting of natural gas and syngas.

6. The engine of claim 1 wherein the gaseous fuel can burn in air only at levels of concentration within a range of about 5%-15% at atmospheric pressure, and the gaseous fuel is delivered to the first compression chamber and compressed at concentration level of at least 25%.

7. The engine of claim 1 wherein the first compression chamber has a compression ratio on the order of 16:1.

8. A method of operating an engine on gaseous fuel, comprising the steps of: adjusting the concentration of the gaseous fuel to a level such that the fuel can be compressed at a ratio of at least 10:1 to 16:1 without predetonating, compressing the gaseous fuel in a first compression chamber having a compression ratio of at least 10:1 to 16:1, compressing air in a second compression chamber, mixing compressed air from the second compression chamber with compressed fuel from the first compression chamber to dilute the gaseous fuel to a level of concentration at which the fuel can burn and expand in a combustion chamber, and delivering expanding gases from the combustion chamber to an expansion chamber to drive an output member in the expansion chamber.

9. The method of claim 8 including the steps of pressurizing the gaseous fuel and the air to increase the amounts of fuel and air supplied to the compression chambers.

10. The method of claim 8 including the step of progressively reducing the concentration level of the gaseous fuel as it travels along a path toward the first compression chamber.

11. The method of claim 10 wherein the concentration level of the gaseous fuel is progressively reduced by injecting air at spaced apart points along the path.

12. The method of claim 8 wherein the gaseous fuel is selected from the group consisting of natural gas and syngas.

13. The method of claim 8 wherein the gaseous fuel can burn in air only at levels of concentration within a range of about 5%-15%, and the gaseous fuel is delivered to the first compression chamber and compressed at concentration level of at least 25%.

14. The method of claim 8 wherein the fuel is compressed in the first compression chamber at a ratio on the order of 16:1.

15. A split cycle engine for burning gaseous fuel, comprising: a first compression chamber of variable volume, a fuel line through which the gaseous fuel is delivered to the first compression chamber, air inlets spaced apart along the line for introducing air into the line to progressively decrease the concentration of the gaseous fuel as it passes through the line, a blower in the line for increasing the pressure and amount of fuel delivered to the first compression chamber, a second compression chamber for compressing air, a blower for increasing the pressure and amount of air delivered to the second compression chamber, a combustion chamber in which compressed fuel and air from the compression chambers are combined to further reduce the concentration of the fuel to a level at which the fuel can burn and expand, and an expansion chamber having an output member which is driven by expanding gas from the combustion chamber.

16. The engine of claim 15 wherein the gaseous fuel is selected from the group consisting of natural gas and syngas.

17. The engine of claim 15 wherein the gaseous fuel can burn in air only at levels of concentration within a range of about 5%-15%, and the gaseous fuel is delivered to the first compression chamber and compressed at concentration level of at least 25%.

18. The engine of claim 15 wherein the first compression chamber has a compression ratio on the order of 16:1.

* * * * *